US011405789B1

(12) United States Patent
Wei et al.

(10) Patent No.: US 11,405,789 B1
(45) Date of Patent: Aug. 2, 2022

(54) CLOUD-BASED SECURE WIRELESS LOCAL AREA NETWORK (WLAN) GROUP SELF-FORMING TECHNOLOGIES

(71) Applicant: Amazon Technologies, Inc., Seattle, WA (US)

(72) Inventors: QingYun Wei, San Jose, CA (US); Andrew Roths, Kenmore, WA (US); Avinash Joshi, San Jose, CA (US); Zhao Lou, Redwood City, CA (US); James Edwin Christy, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 747 days.

(21) Appl. No.: 16/273,647

(22) Filed: Feb. 12, 2019

(51) Int. Cl.
| | |
|---|---|
| *G06F 15/16* | (2006.01) |
| *H04W 12/40* | (2021.01) |
| *H04L 67/10* | (2022.01) |
| *H04L 67/306* | (2022.01) |
| *H04W 8/18* | (2009.01) |
| *H04L 5/00* | (2006.01) |
| *H04L 101/622* | (2022.01) |
| *H04W 76/15* | (2018.01) |
| *H04W 60/00* | (2009.01) |
| *H04L 9/40* | (2022.01) |
| *H04W 4/50* | (2018.01) |
| *H04W 12/50* | (2021.01) |

(Continued)

(52) U.S. Cl.
CPC ............ *H04W 12/40* (2021.01); *H04L 5/0048* (2013.01); *H04L 61/6022* (2013.01); *H04L 63/0869* (2013.01); *H04L 67/10* (2013.01); *H04L 67/306* (2013.01); *H04W 4/50* (2018.02); *H04W 8/18* (2013.01); *H04W 12/062* (2021.01); *H04W 12/50* (2021.01); *H04W 60/00* (2013.01); *H04W 76/15* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 10,419,908 B1 * | 9/2019 | Hutz | H04W 60/00 |
| 2007/0157024 A1 * | 7/2007 | Miller | H04L 67/14 |
| | | | 713/168 |

(Continued)

*Primary Examiner* — Brian Whipple
*Assistant Examiner* — Gregory P Tolchinsky
(74) *Attorney, Agent, or Firm* — Lowenstein SandlerLLP

(57) ABSTRACT

Technologies for cloud-based secure WLAN group self-forming are described. One provisioner portal device receives, from a client provisionee device that desires to connect to a home WLAN, a first SSID and forwards, to a cloud service via a wireless AP device, the first SSID and a MAC address. The provisioner portal device receives, from the cloud service via the WAP device, a second SSID and a passphrase. The provisioner portal device sends, to the client provisionee device, a response that includes the second SSID. The provisioner portal device creates a one-time provisioning wireless network with the second SSID and the passphrase. Through the provisioner portal device, WAP credentials can be exchanged from the cloud server to the client provisionee device over a secure channel. The WAP credentials can be used to switch to the home WLAN without user interaction to manually enter the WAP credentials at the client provisionee device.

20 Claims, 7 Drawing Sheets

(51) Int. Cl.
*H04W 12/062* (2021.01)
*H04W 84/12* (2009.01)

(56) References Cited

U.S. PATENT DOCUMENTS

| | | | | |
|---|---|---|---|---|
| 2009/0253409 | A1* | 10/2009 | Slavov | H04W 12/35 |
| | | | | 455/411 |
| 2012/0127980 | A1* | 5/2012 | Quinn | H04W 8/005 |
| | | | | 370/338 |
| 2014/0317242 | A1* | 10/2014 | Koo | H04W 4/80 |
| | | | | 709/219 |
| 2014/0337950 | A1* | 11/2014 | Yang | H04W 12/122 |
| | | | | 726/7 |
| 2018/0160252 | A1* | 6/2018 | Olive | H04L 67/34 |
| 2020/0045239 | A1* | 2/2020 | Suzuki | G03B 15/00 |
| 2021/0065210 | A1* | 3/2021 | Van Canh | H04L 63/061 |

\* cited by examiner

US 11,405,789 B1

CLOUD-BASED SECURE WIRELESS LOCAL AREA NETWORK (WLAN) GROUP SELF-FORMING TECHNOLOGIES

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present embodiments will be understood more fully from the detailed description given below and from the accompanying drawings of the present disclosure, which, however, should not be taken to limit the present embodiments, but are for explanation and understanding only.

DETAILED DESCRIPTION

Figure 1:
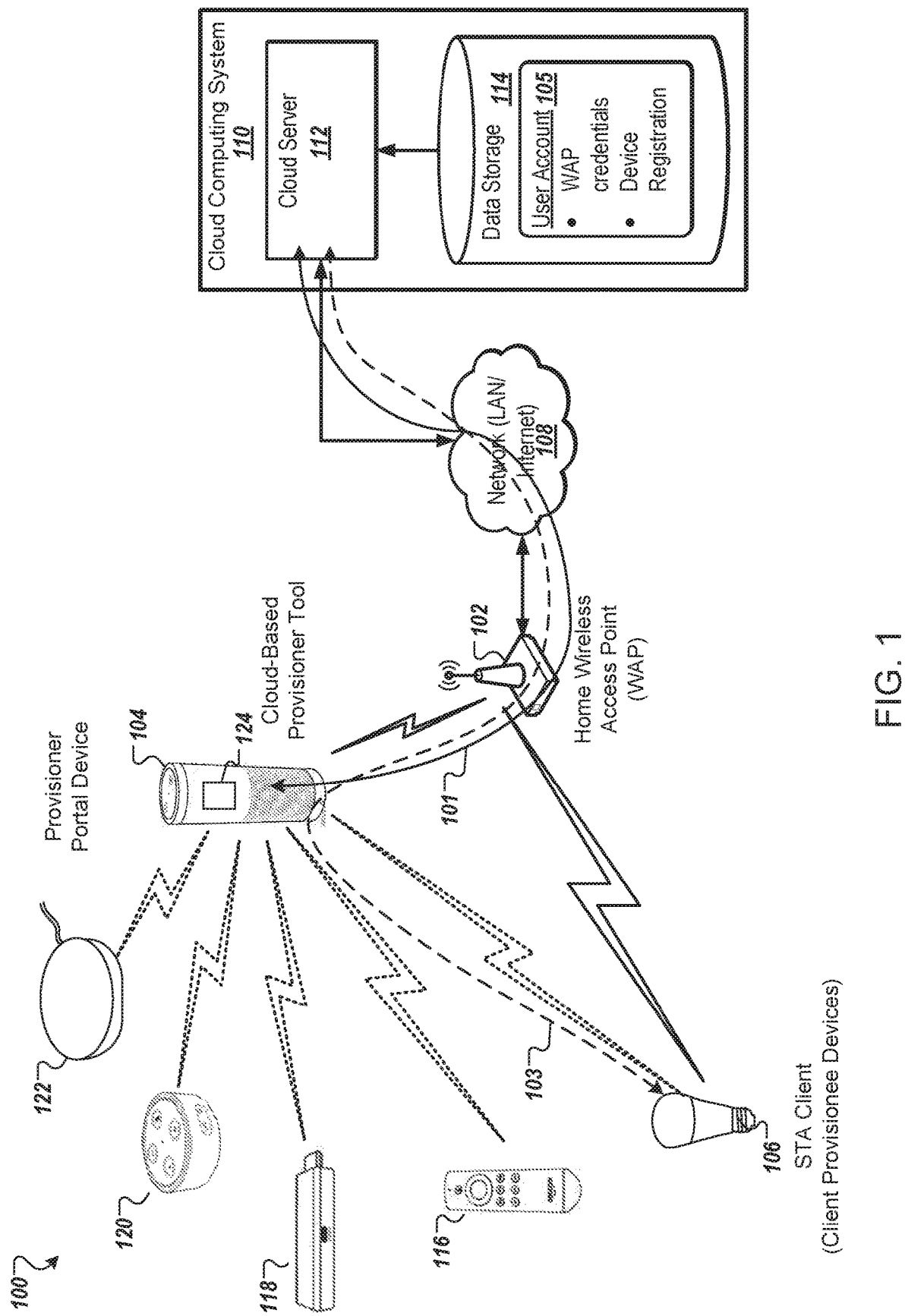
FIG. 1 is a system diagram of a cloud-based provisioning system for self-forming a wireless area network (WLAN) group according to one embodiment.

Technologies for cloud-based secure WLAN group self-forming are described. Conventionally, when a new station client (e.g., wireless client device) needs to connect to a home WLAN (also referred to as a target WLAN), a user manually enters the credentials at the station client. Some station clients do not have the ability to manually enter the credentials and thus rely on a companion device to enter the credentials. Even in those cases, the user manually enters the credentials companion device so that the station client can connect and communicate on the home WLAN. These conventional approaches are not self-forming, can be complicated for certain users, and require user interaction to setup the station client being added to the home WLAN.

The embodiments described herein provide an approach to implement secure WLAN group self-forming process on top of a normal WLAN scan message exchange. With this approach, a first-party product can operate as a provisioner portal device that is registered under a cloud-service user account of a cloud service. When a first-party (1P) device or a third-party (3P) device is seeking to join the home WLAN as a client provisionee device (also referred to a new enrollee device), the provisioner portal device is able to discover the client provisionee device over WLAN (e.g., a Wi-Fi® network), verify it is a valid enrollee device that has been pre-registered to the cloud service, and then negotiate provisioning wireless access point (WAP) credentials (e.g., SSID and passphrase) with the client provisionee device over a standard WLAN scan procedure (e.g., the Wi-Fi® scan procedure). After generating the provisioning WAP's credentials, the provisioner portal device creates the one-time provisioning wireless network (e.g., a one-time provisioning AP, a provisioning AP, a provisioning ad-hoc network, or the like). Then the client provisionee device connects to this provisioning AP to access the cloud service and further authenticate itself. With the above procedure, the client provisionee device is able to obtain the home AP's credential from the cloud and configure its WLAN settings and connect to the home WLAN without requiring any user interactions. The secure WLAN group self-forming process can be also deployed as a group self-forming mechanism to allow the wireless devices, managed by the cloud service, to create a WLAN ad-hoc network on-demand. Such ad-hoc WLAN can be used to support remote debugging, firmware updating and other device diagnosis and maintenance functionalities.

The embodiments described herein can leverage the standard Wi-Fi scan protocol to implement a device discovery procedure, a pre-authentication procedure, and WLAN credentials provisioning procedure. In one implementation, since the WLAN stacks (e.g., Wi-Fi stacks) on all 1P and 3P enrollee devices only need to support direct scan procedure (Wi-Fi direct scan), the discovery, authentication and provisioning procedures can be implemented using the WLAN layer scan (e.g., Wi-Fi layer scan) and association APIs on different platforms.

One provisioner portal device receives, from a client provisionee device that desires to connect to a home wireless local area network (WLAN), a first request including a first service set identifier (SSID), which is derived from at least a SSID token and a client nonce. Alternatively, the first SSID includes a device identifier, a MAC address, or other identifier information that identifies the client provisionee device. The provisioner portal device forwards, to a cloud service via a wireless access point (WAP) device, the first SSID and a media access control (MAC) address associated with the client provisionee device. The provisioner portal device receives, from the cloud service via the WAP device, a second SSID and a passphrase. The second SSID is derived from at least the SSID token and a server nonce (e.g., a first random value). The second SSID and passphrase can be derived from the client nonce and the server nonce (e.g., a second random value). The provisioner portal device sends, to the client provisionee device, a response that includes the second SSID. Alternatively, the second SSID is not sent directly, but the 4-way handshake is used to ensure both sides not the passphrase and don't disclose it while authenticating. The provisioner portal device creates a wireless network (e.g., one-time provisioning AP) with the second SSID and the passphrase. The provisioner portal device receives, from the provisionee device, a second request with the passphrase to connect to the wireless AP. The provisioner portal device forwards, to the client provisionee device from the cloud service over a secure channel, WAP credentials associated with the home WLAN so that the client provisionee device can switch to connect to the home WLAN using the WAP credentials without user interaction to manually enter the WAP credentials at the client provisionee device. The provisioner portal device can send a command, in connection with the WAP credentials, that causes the client provisionee device to switch to the home WLAN from being connected to the one-time provisioning wireless network.

FIG. 1 is a system diagram of a cloud-based provisioning system 100 for self-forming a wireless area network (WLAN) group according to one embodiment. The cloud-based provisioning system 100 includes a home wireless access point (WAP) device 102. The home WAP device 102 is connected to a cloud computing system 110 over a network 108. The network 108 can include one or more public or private networks, such as the Internet. The home WAP device 102 can be a standalone product or can be integrated into a modem, a router, a switch, a wireless network device, or any combination thereof, to provide access to the cloud computing system 110 via a LAN or Internet access. For example, the home WAP device 102 can be hard wired or otherwise connected to a cable modem that provides the LAN and Internet access and the home WAP device 102 provide wireless access to wireless clients to the LAN and Internet access.

The cloud computing system 110 can include one or more cloud servers 112, one or more data storage device 114, as well as other resources. The cloud server 112 provides a cloud service that can securely store WAP credentials associated with a home WAP device (e.g., SSID of the home WLAN and passphrase), device registration information, or the like. The WAP device includes at least one WLAN radio (e.g., Wi-Fi® radio) that operates at 2.4 GHz, 5 GHz, or both. Alternatively, the provisioning system can be done with a remote server or other networking configurations.

The cloud-based provisioning system 100 includes a provisioner portal device 104 that includes at least one WLAN radio and a cloud-based provisioner tool 124. The cloud-based provisioner tool 124 can operate to securely provision WAP credentials of a home WLAN without user interaction to manually enter the WAP credentials at a client provisionee device. The operations of the cloud-based provisioner tool 124 are described in more detail below. The provisioner portal device 104 can be registered to a cloud user account 105 that also securely stores the WAP credentials. The provisioner portal device 104 is connected to the cloud service (cloud computing system 110) over a first secure channel 101 via the home WAP device 102. The home WAP device 102 can already be connected to the provisioner portal device 104, as well as zero or more station clients via the home WLAN. The cloud-based provisioner tool 124 can be used to deliver the WAP credentials, as well as other registration tokens or other information to facilitate access to cloud services or resources.

When any one or more of the station client 106, 116, 118, 120, and 122 is to be added to the home WLAN, the provisioner portal device 104 can perform the discovery, authentication and provisioning procedures in the WLAN layer scan (e.g., Wi-Fi layer scan) and association APIs on different platforms and it can perform these procedures without user interactions to manually enter the WAP credentials at the station clients 106-120 to connect these station clients 106, 116, 118, 120, and 122 to the home WLAN provided by the home WAP device 102.

For example, a station client 106 (e.g., a smart bulb) can be a client provisionee device (or enrollee device). Hereinafter, the station client 106 is referred to as the client provisionee device 106, but similar operations can be done for the other station clients 116, 118, 120, and 122. The client provisionee device 106 includes a WLAN radio and is registered to the cloud user account 105 of the cloud service. For example, the data storage device 114 stores a user account 105 with the device registration information for the client provisionee device 106, as well as the WAP credentials for the home WLAN provided by the home WAP device 102.

In one embodiment, during operation, the client provisionee device 106 broadcasts a direct probe request frame to create a one-time provisioning wireless network by the provisioner portal device 104. The direct probe request frame identifies: 1) a first service set identifier (SSID) in a SSID information element (IE) field; and 2) and 2) a media access control (MAC) address associated with the client provisionee device 106 to the cloud server 112 (cloud service). For example, the frame includes the MAC in a source field. The first SSID is an encoded and signed structure that contains identity information of the client provisionee device 106. The identity information can be a device identifier, a MAC address, or other identifier for the client provisionee device 106. The encoded and signed structure can be used by the cloud server 112 to derive a provisioner SSID (second SSID) and a provisioner passphrase. Alternatively, the first SSID is an encrypted and signed structure that contains identity information of the client provisionee device 106. Alternatively, the first SSID is not signed. The provisioner portal device 104 receives the direct probe request frame and forwards the direct probe request frame to the cloud server 112 (cloud service). The cloud server 112 verifies that the client provisionee device 106 is registered to the cloud user account 105. The cloud server 112 decodes the encoded and signed structure and generates a second SSID and a passphrase for the one-time provisioning wireless network. The provisioner portal device 104 receives the second SSID and the provisioner passphrase from the cloud server 112, forwards the second SSID in a SSID IE field in a direct probe response frame to the client provisionee device 106, and creates the one-time provisioning wireless network with the second SSID and the provisioner passphrase. The client provisionee device 106 receives the direct probe response frame and connects to the one-time provisioning wireless network. The client provisionee device 106 can conduct mutual authentication with the one-time provisioning wireless network via a 4-way handshake and establish a second secure channel 103 to the cloud server 112 through the one-time provisioning wireless network. The cloud server 112 transfers the WAP credentials to the client provisionee device 106 over the second secure channel 103. The client provisionee device 106 connects to the home WLAN provided by the WAP device 102 using the WAP credentials. The client provisionee device 106 connects to the WAP device 102 without user interaction to manually enter the WAP credentials at the client provisionee device 106.

In a further embodiment, the client provisionee device 106 generates a random one-time SSID token (e.g., a random one-time 4-byte SSID token), a client nonce (e.g., a 12-byte nonce), and a message integration code (MIC) (e.g., 8-byte MIC). The client provisionee device 106 encodes the one-time SSID token into an encoded SSID token. The client provisionee device 106 concatenates the encoded SSID token, the client nonce, and the MIC into a binary string (e.g., 24-byte binary string) and encodes the binary string into a character string (e.g., 32-byte ASCII string or a character string that includes ASCII or Unicode characters as expected in SSID fields). The binary string can be encoding using a 64-byte encoding function, such as BASE64 to drive the character string. The 32-byte ASCII string is the first SSID that is sent by the client provisionee device 106 to the provisioner portal device 104. In one embodiment, the cloud server 112 retrieves a public key associated with the client provisionee device 106 from a registration database using the MAC address received from the provisioner portal device 104. The cloud server 112 verifies, using the first MIC, that the first ASCII string is encoded and signed by the provisioner portal device 104. The cloud server 112 decodes the first encoded SSID token to derive a random one-time SSID token (e.g., 4-byte SSID token) using the public key associated with the client provisionee device 106 and a private key associated with the cloud service. The cloud server 112 generates a server nonce (s_nonce) (e.g., 12-byte nonce) and a second MIC (e.g., 8-byte MIC). The cloud server 112 encodes the one-time SSID token into a second encoded SSID token. The cloud server 112 concatenates the second encoded SSID token, the server nonce, and the second MIC into a binary string (e.g., 24-byte string) and encodes the binary string into a second ASCII string (e.g., 32-byte character string). The second ASCII string is the second SSID that the cloud server 112 sends to the provisioner portal device 104. The cloud server 112 performs a cryptographic function (e.g., HMAC_SHA256) on a first concatenation of the server nonce and the client nonce to derive a first binary session key (e.g., 32-byte binary session key) and converts the first binary session key to a third ASCII string. The third ASCII string is the provisioner passphrase that the cloud server 112 sends to the provisioner portal device 104. The cloud server 112 sends the second SSID and the provisioner passphrase to the provisioner portal device 104 over the first secure channel 101. The provisioner portal device receives the second SSID and the provisioner passphrase from the cloud server 112 and creates the one-time provisioning AP with the second SSID and the provisioner passphrase.

In one embodiment, the provisioner portal device 104 sends a direct probe response frame to the client provisionee device 106 with the requested SSID (i.e., first SSID). The direct probe response frame includes an SSID field with provisioner SSID (i.e., second SSID). The client provisionee device 106 can decode the second SSID to derive a SSID token that matches the random one-time SSID token of the first SSID. The client provisionee device 106 performs the cryptographic function (e.g., HMAC_SHA256) on a second concatenation of the server nonce and the client nonce to derive a second binary session key (e.g., 32-byte binary session key) and converts the second binary session key to a fourth ASCII string (e.g., 32-byte ASCII string). The fourth ASCII string is the provisioner passphrase that the client provisionee device 106 uses to connect to the home WLAN. The client provisionee device 106 authenticates itself with the cloud service over the second secure channel 103 and switches to connect to the WAP device 102 using the WAP credentials. The client provisionee device 106 can also conduct firmware updating, system diagnosis and other functions through the secure channel via the provisioning AP.

As described above, the discovery, authentication, and provisioning procedures described above with respect to the station client 106 can be performed for the other station clients 116, 118, 120, and 122. The station clients 106, 116, 118, 120, and 122 can be 1P or 3P devices. The station clients 106 can be any electronic device that includes a wireless interface, such as Wi-Fi® radio chipset that permits the electronic device to wireless connect to the provisioner portal device 104 and the home WAP device 102.

The station client can include various components, such as one or more processors (e.g., a host processor or central processing unit (CPU), one or more graphic processors, input-output (I/O) devices, memory devices, storage devices, or the like. The station client can be an Internet of Things (IoT) device, a portable computing device, or other user devices. The user device can be a content rendering device that includes a modem for connecting the user device to a network, electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, voice control and speaker devices, smart switches, smart bulbs, remotes, televisions, television set top boxes, television dongles, or the like. The station client may also be an audio-input-enabled device, such as the Amazon Echo device, developed by Amazon Technologies, Inc. of Seattle Wash. Alternatively, the station client may be a set-top box (STB) or other media streaming device. The electronic device may connect to a network to obtain content from a server computing system (e.g., an item providing system) or to perform other activities. The station client can connect to one or more different types of cellular networks, personal area networks (PANs) in addition to the WLAN (e.g., Wi-Fi® networks). In some embodiments, the station client using the provisioned credentials connects to an access point (AP), which provides access to the Internet, a private network, or other public networks.

The station client includes a circuit board, such as a printed circuit board (PCB) upon which one or more of the components described above is disposed. The components can be integrated into one or more integrated circuits. In some embodiments, the components can separate integrated circuits or chipsets. In other embodiments, the components can reside on a common carrier substrate die of an integrated circuit. For example, the station client can include a processing element, one or more radios, including a baseband processor and RF front-end circuitry. The baseband processor is operable to generate RF signals to radiate electromagnetic energy via one or more antennas. In some cases, the baseband processor and other circuitry can be implemented in a RF module, such as a chipset implementing the Wi-Fi® technology. In addition to the baseband processor, the station client can also include an application processor (AP) that implements other operations of the station client. In another embodiment, an application-specific integrated circuit (ASIC), a field-programmable gate array (FPGA), or other mixed-signal integrated circuits may be used to implement the operations described herein. In one embodiment, the baseband processor includes one or more transceivers that can operate at 2.45 GHz and 5 GHz. The baseband processor can implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio may include additional transceivers that operate in the 2.45 GHz, 5 GHz, or both. A PAN module includes a transceiver that also operates at 2.4 GHz and may implement the Bluetooth® technology or the Zigbee® technology. The WLAN radio and PAN radio can be individual chipsets, even chipsets provided by different vendors. The WLAN radio and the PAN radio may be implemented in the same chipset or on a common carrier substrate with a processing device, such as in a System on Chip (SoC) architecture. In another embodiment, other wireless RF radios may be used to implement other technologies, such as the LTE technology, or the like. For example, the RF circuitry may include other radios, such as a wireless area network (WAN) radio, PAN radio, GNSS radio (e.g., global positioning system (GPS) radio), or the like. In other embodiments, the antenna architecture may include additional RF radios and/or other communication modules, such as a WLAN radio, a GPS receiver, a near field communication (NFC) radio, an amplitude modulation (AM) radio receiver, a frequency modulation (FM) radio receiver, a PAN radio (e.g., Bluetooth® radio, Zigbee® radio), a GNSS receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1xRTT, EVDO, HSDPA, WLAN (e.g., Wi-Fi® network), etc. In the depicted embodiment, the modem can use the RF circuitry to radiate electromagnetic energy on the antennas to communication data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables functionality of both transmission and receiving data using reciprocity.

It should also be noted that the provisioner portal device 104 can also be considered a station client with respect to the home WAP device 102. The station clients can also be configured to operate as a provisioner portal device as well. That is the other station clients can include the cloud-based provisioner tool 124 (not illustrated in FIG. 1). In one embodiment, the cloud-based provisioner tool 124 is implemented as hardware, software, firmware, or any combination thereof. In some embodiments, the cloud-based provisioner tool 124 can operate on top of the Wi-Fi® stack that includes the Wi-Fi® direct scan procedure, as illustrated and described with respect to FIG. 2B. It should be noted that although described with respect to Wi-Fi® technologies, the cloud-based provisioner tool 124 can operate in connection with other WLAN technologies.

Figures 2A, 2B:
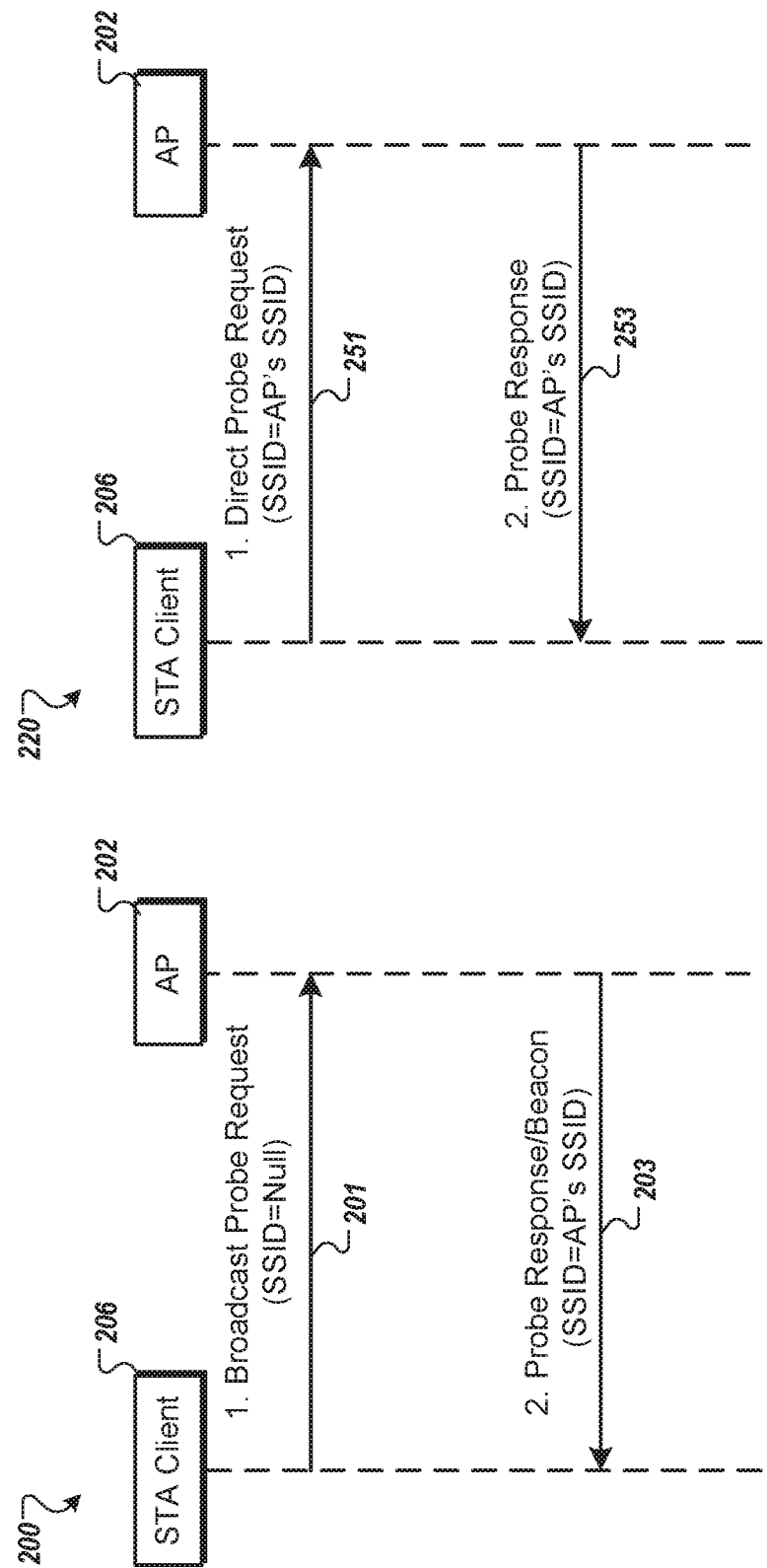
FIG. 2A is a sequence diagram of a broadcast scan procedure by a station client and a wireless access point to establish a wireless connection in a wireless local area network (WLAN) according to one embodiment.
FIG. 2B is a sequence diagram of a direct scan procedure by a station client and a wireless access point to establish a wireless connection in a WLAN according to one embodiment.

FIG. 2A is a sequence diagram of a broadcast scan procedure 200 by a station client 206 and a wireless access point 202 to establish a wireless connection in a wireless local area network (WLAN) according to one embodiment. FIG. 2B is a sequence diagram of a direct scan procedure 250 by a station client 206 and a wireless access point 202 to establish a wireless connection in a WLAN according to one embodiment. The station client 206 can correspond to any one of the station clients 106, 116, 118, 120, and 122 of FIG. 1. The wireless access point 202 can correspond to the home WAP device 102 of FIG. 1. To discover all of the AP devices on a Wi-Fi network, the Wi-Fi station client 206 sends probe request frames at each Wi-Fi channel and listens to the probe responses and beacons from the APs. There are two types of scan requests: broadcast scan as illustrated in FIG. 2A and direct scan as illustrated in FIG. 2B.

Referring back to FIG. 2A, in the broadcast scan procedure 200, the SSID information element (IE) field of a probe request frame 201 is empty with 0 length. All of the APs with non-hidden SSID will reply to the broadcast probe request with probe responses 203.

Referring back to FIG. 2B, in the direct scan procedure 250, the SSID IE of the probe request frame 251 is specified as the target AP's SSID. Only the AP having the specified SSID will reply to the direct probe request with probe responses 253. The direct scan can be used to discover APs with hidden SSID (that means the APs do not include the SSID information in their beacons). In the AP's probe responses to the broadcast or direct probe requests, the SSID IE field is filled with the AP's SSID. The probe requests are always sent as broadcast frames at Wi-Fi layer. The probe responses are sent as Wi-Fi unicast frames targeted only to the corresponding probe request senders. According to IEEE 802.11 specification, the maximal SSID IE length in the probe request and response is 32 bytes and the SSID IE is normally implemented to only contain ASCII or Unicode characters (referred to herein as character strings). The direct scan of FIG. 2B can be used by the client provisionee device 106 and the provisioner portal device 104 to discover, authentication and securely provision home AP credentials to the client provisionee device 106, as illustrated and described with respect to FIG. 3. Some Wi-Fi station clients have an API to allow upper layer to specify a target SSID to send direct probe requests before associating to that target AP (home AP) with the SSID. To reply the direct probe requests, the AP always includes the SSID IE in the corresponding probe responses. The station client passes the AP's SSID information to upper layer through the Wi-Fi scan result API. By leveraging the common Wi-Fi scan APIs and the exchange of SSID IEs in probe requests and responses, the Wi-Fi station client and 1P provisioner portal device can negotiate the provisioning AP's credentials. That is, the cloud-based provisioner tool 124 can perform WLAN group self-forming procedures on top of the Wi-Fi® direct scan.

The cloud-based provisioning process can involve the following four entities: 1) a home AP (or home WAP device) that is the target access point that provides the LAN and Internet access to client stations (already connected devices as well as the provisionee devices); 2) Provisionee (or client provisionee device) that can be the Wi-Fi client device seeking to connect to the provisioner portal network in order to learn the home AP's credentials or conduct other functionalities through the provisioner portal network created by the provisioner portal device; 3) Provisioner (or provisioner portal device) that is the provisioner portal device that has connected to the Internet and can talk to the cloud service; and 4) Cloud server (or cloud service) that stores home AP's credentials and communicates with the provisioner and provisionee over the secure channels like over TLS. One purpose of this procedure is to transfer the home AP's Wi-Fi credentials (SSID and passphrase) to the provisionee devices securely without any user interactions. The provisioner device is able to receive the probe request frames and create a software-enabled access point (softAP) or a Wi-Fi permanent p2p-GO (peer-to-peer group owner) interface that is running as provisioning AP. The provisioner devices and the backend cloud server form a portal network to serve the provisionee devices.

In one embodiment, to implement this self-group forming mechanism, the following requirements need to be fulfilled before the provisionee, provisioner and cloud server start the discovery, authentication and provisioning procedures: 1) The provisioner portal has been registered under a cloud user account 105 and it has a secure TLS channel connected to the cloud service; 2) a 2D QR code label containing the public key and MAC address information that is associated or otherwise attached to the provisionee device; 3) the provisioning cloud server's certificate or public key has been preloaded in the provisionee device; and 4) the cloud server stores the home AP's credentials of cloud user account 105.

Over the TLS channel, the provisioner reports the discovered provisionee's device information to the cloud server, and the cloud server returns the negotiated provisioning AP credentials (SSID and passphrase) to the provisioner. After provisionee connects to the provisioner's provisioning AP, it can further connect to the cloud server, authenticate itself, retrieve the home AP's credentials and conduct other operations like firmware updating and system diagnosis. For the 2D QR code label, when the product is purchased by the end user under a cloud user account 105, the product's provisionee public key and MAC address are scanned into the provisioning cloud database along with the corresponding purchaser's user account 105 information. Provisionee is able to use the cloud server's public key and its own private key to encode the coded SSID string to conduct Wi-Fi scan. The public/private keys of the provisioning method are elliptic curve based. The cloud server stores the home AP's credentials of cloud user account 105. After provisionee connects to the provisioner's provisioning AP, it can further connect to the cloud server, authenticate itself, retrieve the home AP's credentials and conduct other operations like firmware updating and system diagnosis.

Provisionee just broadcasts probe requests. In the probe requests, the SSID field is an encoded and signed structure that contains the provisionee's identity. With the coded SSID, the provisionee also sends a request to ask the potential provisioner to create a one-time provisioning AP with the specified SSID and passphrase. After the 1P provisioner receives such probe requests, it asks the cloud server to decode the coded SSID structure to derive the requested SSID and generate the passphrase. If the provisionee is verified to be a valid and registered device by the cloud server, the provisioner will go ahead to create such provisioning AP with the negotiated SSID and passphrase. After that, provisionee can find this provisioning AP's coded SSID from the scan result and derive the passphrase. And then, provisionee connects to the provisioning AP to further authenticate itself using the negotiated credentials over the Wi-Fi 4-way handshake. Through the provisioning AP, the cloud server transfers the home AP's credentials to the provisionee over a secure channel (e.g., TLS/SSL). Provisionee can also continue accessing various cloud services over this on-demand provisioning AP.

Figure 3:
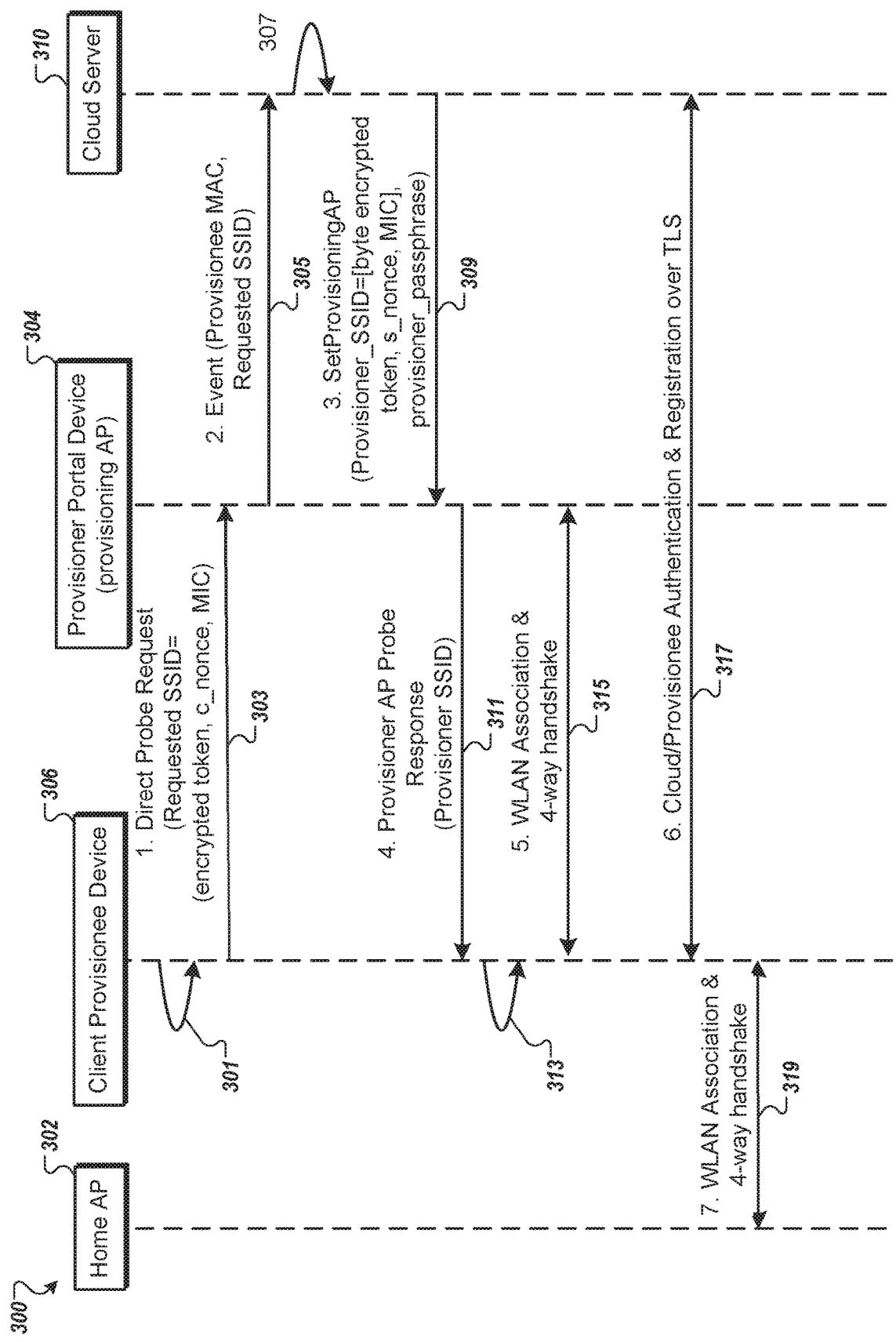
FIG. 3 is a sequence diagram of a cloud-based provisioning process for self-forming a WLAN group according to one embodiment.

The cloud-based provisioning process can be a SSID token based zero-touch provisioning method as illustrated and described with respect to FIG. 3

FIG. 3 is a sequence diagram of a cloud-based provisioning process 300 for self-forming a WLAN group according to one embodiment. At 301, the cloud-based provisioning process 300 beings by a client provisionee device 306 (enrollee) generates a random one-time 4-byte SSID token and a 12-byte client nonce c_nonce, and follows ECIES procedure to encode the 4-byte SSID with provisionee's private key and cloud server's public key. The client provisionee device 306 concatenates the encoded 4-byte SSID token, 12-byte nonce and 8-byte message integration code (MIC) into a 24-byte binary string. The 24-byte binary string is encoded with a 64-byte encoding (e.g., BASE64) to generate a 32-byte ASCII string, which is the requested SSID (e.g., a first SSID). The first 32-bytes or the second 32-bytes can be used. Alternatively, any designated 32 bytes from the 64-byte encoding can be used. The client provisionee device 306 sends the coded requested SSID IE in a direct probe request 301 during a direct scan.

A provisioner portal device 304 (provisioning AP) receives the probe request with the BASE64-encoded requested SSID IE and forwards an event message 305 with the coded SSID to cloud server along with the provisionee's MAC address over a TLS secure channel to a cloud server 310 of a cloud service. At 307, the cloud server 310 can retrieve the provisionee's public key from the registration database based on the provisionee MAC address. Using its private key and provisionee's public key, the cloud server 310 decodes the SSID token and verifies the MIC code to make sure if the SSID string is correctly encoded and signed by the registered provisionee. Then cloud server generates a 12-byte server nonce s_nonce and uses server's private key and provisionee's public key to encode and sign the 4-byte SSID token into a 24-byte binary string. The binary string contains 4-byte encoded SSID token, 12-byte s_nonce and 8-byte MIC. The 32-byte BASE64 encoded ASCII string of the 24-byte binary string becomes the provisioner SSID. Server runs keyed HMAC_SHA256 over the 24-byte concatenation of c_nonce and s_nonce to generate a 32-byte binary session key and convert the session key into a BASE64 coded ASCII string. The first 32-byte of BASE64 string becomes provisioner passphrase. The cloud server 310 returns a return message 309 (SetProvisioning AP) with the provisioner SSID and provisioner passphrase to provisioner portal device 304 over the TLS secure channel.

The provisioner portal device 304 creates the provisioning AP using the credentials (provisioner SSID and provisioner passphrase) returned by the cloud server 310. The provisioning AP (provisioner portal device 304) starts replying to the client provisionee device's 306 probe request 303 with the probe response 311. In the probe response 311, the SSID IE field is the BASE64 encoded 32-byte ASCII provisioner SSID (second SSID).

From the scan results at 313, the client provisionee device 306 finds that there is an AP with BASE64 encoded 32-byte provisioner SSID. The client provisionee device 306 tries to decode the provisioner SSID using its own private key and server public key to derive the decoded 4-byte SSID token. If the decoded SSID token matches its requested SSID token, provisionee confirms that the provisioner AP is inviting it to join the network. The client provisionee device 306 goes ahead to generate the 32-byte session key by running keyed HMAC_SHA256 over the 24-byte concatenation of c_nonce and s_nonce. Then the provisioner passphrase can be derived from the first 32-byte of BASE64 coded ASCII string of the session key. The client provisionee device 306 connects to the provisioner AP (created by the provisioner portal device 304) and conducts the mutual authentication with provisioner portal device 304 via a Wi-Fi 4-way handshake 315. At 317, the provisioner portal device 304 can operate as a gateway to allow the client provisionee device 306 to establish TLS connections to the cloud server 310 over the provisioning AP. The client provisionee device 306 further authenticates itself with the cloud server 310. At 317, the cloud server 310 transfers the corresponding cloud user account's home AP credentials to the client provisionee device 306. At 317, the client provisionee device 306 can also conduct firmware updating, system diagnosis and other functions through the provisioning AP. Using the obtained home AP credentials, the client provisionee device 306 switches to connect to the home AP with the AP credentials via a Wi-Fi 4-way handshake 319.

The following description provides one example of SSID message encoding and decoding procedures that can be performed by client provisionee device 306 and cloud server 310. The SSID token to SSID IE field encoding in the SSID message encoding procedures can use the following cryptographic primitives:

ECDH Shared Key Generation:
  ECDH_SHA_compute_key(local_private key, peer_public key) ECDH (Elliptic Curve Diffie Hellman) key generation function ECDH_SHA_compute_key is used to compute the ECDH shared key based on the local elliptic curve private key and peer public key. ECDH share key is the SHA hash code of the share secret code that's is computed from the local private key and the remote peer's public key.

Symmetric Encryption/Decryption and Message Authentication/Verification:
  AES256_GCM_ENCRYPT(Key, IV, Plain text, AAD)
  AES256_GCM_DECRYPT(Key, IV, Encrypted_text, AAD, Tag) AES GCM mode with 256-bit key length is used for the SSID token encryption/decryption and message authentication/verification. AES256_GCM_ENCRYPT( ) returns two values: the encrypted cipher text and the authentication tag. AES256_GCM_DECRYPT( ) decrypts the cipher text and run the tag authentication code verification simultaneously.

Keyed-Hash Message Authentication Code, HMAC:
  HMAC_SHA256(Key, Text)
  HMAC_SHA256 is used to derive the provisioning AP passphrase from the nonce text using the ECDH shared key.

Binary-to-ASCII Encoding and Decoding:
  BASE64 ENCODE(Binary_string)
  BASE64 DECODE(ASCII_string)
  BASE64 is the binary-to-ascii codec method.

With reference to the cryptographic primitives above, the client provisionee device 306 can encode the requested SSID structure (first SSID) by the following operations:
  1. Provisionee uses its elliptic curve private key and cloud server's public key to create a 256-bit key ECDH_Key by calling ECDH (Elliptic Curve Diffie Hellman) key generation primitive ECDH_SHA_compute_key( ):
    ECDH_key=ECDH_SHA_compute_key(provisionee_private_key, cloud_server_public_key)
  2. Provisionee generates a random 4-byte SSID_token, and a 12-byte client nonce c_nonce.
  3. The 12 bytes of c_nonce will be the IV for AES256_GCM encryption, and the 6-byte provisionee MAC address will be the AAD (Additional Authenticated Data) for the AES256_GCM authentication:
    IV=c_nonce
    AAD=Provisionee MAC address
  4. Using ECDH_key as the encryption key and c_nonce as the IV, provisionee calls AES256_GCM_ENCRYPT to encode SSID token into the 4-byte c_token_cipher and 8-byte client message integration code C_MIC:
    c_token_cipher, C_MIC=AES256_GCM_ENCRYPT(ECDH_key, IV, SSID_token, AAD)
  5. Concatenating the c_token_cipher, c_nonce and C_MIC, a 24-byte BIN_REQUESTED_SSID is created:
    BIN_REQUESTED_SSID=(c_token_cipher||c_nonce||C_MIC)
  6. Using BASE64, the 24-byte BIN_REQUESTED_SSID is converted into a 32-byte ASCII_string REQUESTED_SSID, which will be the SSID IE field in the direct scan probe request:
    REQUESTED_SSID=BASE64 ENCODE(BIN_REQUESTED_SSID)

With reference to the cryptographic primitives above, the cloud server 310 can decode the requested SSID structure (first SSID or REQUESTED_SSID structure), which is forwarded by the provisioner portal device 304, by the following operations:
  1. Compute the 256-bit ECDH_Key using cloud server's elliptic curve private key and provisionee's public key:
    ECDH_Key=ECDH_SHA_compute_key(cloud_server_private_key, provisionee_public_key)
  2. Convert the ASCII REQUESTED_SSID into the 24-byte BIN_REQUESTED_SSID by calling BASE64 DECODE:
    BIN_REQUESTED_SSID=BASE64 DECODE(REQUESTED_SSID)
  3. Retrieve the 4-byte c_token_cipher, 12-byte c_nonce and 8-byte C_MIC from the BIN_REQUESTED_SSID:
    c_toke_cipher=BIN_REQUESTED_SSID[0 . . . 3]
    c_nonce=BIN_REQUESTED_SSID[4 . . . 15]
    C_MIC=BIN_REQUESTED_SSID[16 . . . 23]
  4. The 12 bytes of c_nonce will be the IV for AES256_GCM decryption, and the provisionee's 6-byte MAC address will be the AAD for the AES_GCM additional authentication data:
    IV=c_nonce
    AAD=Provisionee MAC address
  5. Using ECDH_Key as the decryption key along with IV, AAD and C_MIC, cloud server calls AES256_GCM_DECRYPT to decrypt c_token_cipher into the 4-byte SSID_token:
    SSID_token=AES256_GCM_DECRYPT(ECDH_Key, IV, c_token_cipher, AAD, C_MIC)
  AES256_GCM_DECRYPT also verifies if the C_MIC value is valid.

With reference to the cryptographic primitives above, after the SSID_token has been decoded and verified by the cloud server 310, the cloud server 310 can perform the following to generate PROVISIONER_SSID (second SSID) and deriver a PROVISIONER_PASSPHRASE:
  1. Generate a random 12-byte server nonce s_nonce.
  2. The 12 bytes of s_nonce will be the IV for AES256_GCM encryption, and the provisionee's 6-byte MAC address will be the AAD for the AES_GCM additional authentication data:
    IV=s_nonce
    AAD=Provisionee MAC address
  3. Using ECDH_key as the encryption key and s_nonce as the IV, cloud server calls AES256_GCM_ENCRYPT to encode SSID_token provided by the provisionee into the 4-byte s_token_cipher and 8-byte server message integration code S_MIC:

s_token_cipher, S_MIC=AES256_GCM_ENCRYPT (ECDH_key, IV, SSID_token, AAD)

4. Concatenating s_token_cipher, s_nonce and S_MIC, a 24-byte BIN_PROVISIONER_SSID is created:
BIN_PROVISIONER_SSID=(s_token_cipher∥s_nonce∥S_MIC)

5. Using ECDH_Key as the hash key, call HMAC_SHA256 to derive the 32-byte BIN_PROVSIONER_PASSPHRASE from the 24-byte concatenation of c_nonce and s_nonce:
BIN_PROVISIONER_PASSPHRASE=HMAC_SHA256(ECDH_Key, c_nonce∥s_nonce)

6. PROVSIONER_PASSPHRASE is the first 32 bytes of the BASE64 coded BIN_PROVISIONER_PASSPHRASE:
S=BASE64 ENCODE(BIN_PROVISIONER_PASSPHRASE)
PROVISIONER_PASSPHRASE=S[0 . . . 31]

With reference to the cryptographic primitives above, after receiving the provisioner SSID from the scan result, the client provisionee device performs the following operations to decode the PROVISIONER_SSID structure broadcasted by the provisioning AP and derive the PROVISIONER_PASSPHRASE:

1. Convert the ASCII PROVISIONER_SSID into the 24-byte BIN_PROVISIONER_SSID by calling BASE64 DECODE:
BIN_PROVISIONER_SSID=BASE64 DECODE (PROVISIONER_SSID)

2. Retrieve the 4-byte s_token_cipher, 12-byte s_nonce and 8-byte S_MIC from the BIN_PROVISIONER_SSID:
s_toke_cipher=BIN_PROVISIONER_SSID[0 . . . 3]
s_nonce=BIN_PROVISIONER_SSID[4 . . . 15]
S_MIC=BIN_PROVISIONER_SSID[16 . . . 23]

3. The 12 bytes of s_nonce will be the IV for AES256_GCM decryption, and the provisionee's 6-byte MAC address will be the AAD for the AES_GCM additional authentication data:
IV=s_nonce
AAD=Provisionee MAC address 4. Using ECDH_KEY as the decryption key along with IV, AAD and S_MIC, cloud server calls AES256_GCM_DECRYPT to decrypt s_token_cipher into the 4-byte SSID_token:
SSID_token=AES256_GCM_DECRYPT(ECDH_KEY, IV, s_token_cipher, AAD, S_MIC)
AES256_GCM_DECRYPT also verifies if the S_MIC value is valid.

5. Using ECDH_Key as the hash key, call HMAC_SHA256 to derive the 32-byte BIN_PROVSIONER_PASSPHRASE from the 24-byte concatenation of c_nonce and s_nonce:
BIN_PROVISIONER_PASSPHRASE=HMAC_SHA256(ECDH_Key, c_nonce∥s_nonce)

6. PROVSIONER_PASSPHRASE is the first 32 bytes of the BASE64 coded BIN_PROVISIONER_PASSPHRASE:
S=BASE64_ENCODE(BIN_PROVISIONER_PASSPHRASE)
PROVISIONER_PASSPHRASE=S[0 . . . 31]

In other embodiments, other cryptographic primitives and other encoding and decoding techniques can be used. For example, for key agreement, ECIES can be used, such as set forth above. Alternatively, for key agreement the following can be used for encryption: ElGamal; Diffie Hellman; Elliptic Curve Diffie Hellman (signatures can be used for authentication). The above encryption system generally results in establishing a symmetric temporary key from an asymmetric keypair. The following underlying symmetric ciphers can be used: AES (with various modes such as CBC, GCM, CTR, CCM), Simon, Speck, Salsa20 or the variant ChaCha20, 3DES, DES, RC4 or the like.

In one embodiment, the coded SSID formats in the probe request and probe response are shown in Table 1 below as follows, where the SSID_token is in an encrypted field and the client nonce and client MIC are unencrypted fields:

TABLE 1

| 24-byte BIN_REQUESTED_SSID | | |
|---|---|---|
| 4-byte SSID Token | 12-byte Client Nonce c_nonce | 8-byte Client MIC C_MIC |

| 24-byte BIN_PROVISIONER_SSID | | |
|---|---|---|
| 4-byte SSID Token | 12-byte Server Nonce s_nonce | 8-byte Server MIC S_MIC |

In some embodiments, the station clients do not provide a direct scan Wi-Fi® API. To send the requested SSID (first SSID) and receive the provisioner SSID (second SSID), the client provisionee device 306 can perform the following operations:

1. The client provisionee device 306 creates a dummy WLAN profile (e.g., dummy Wi-Fi profile) with the coded requested SSID and arbitrary random passphrase, and calls the Wi-Fi connect API to ask the Wi-Fi stack to associate to that SSID using the dummy profile. The Wi-Fi stack sends the direct probe requests in order to locate the SSID of the profile.

2. The client provisionee device 306 retrieves the scan results from time to time to check if a provisioner portal device (e.g., 304) has replied the coded provisioning AP SSID.

3. If the provisioner portal device is located from the scan result, according to replied provisioner SSID, the client provisionee device 306 derives the provisioning passphrase and creates a new Wi-Fi profile. Then the client provisionee device 306 connects to that provisioner AP (created by the provisioner portal device 304) using the new Wi-Fi profile.

In some embodiments, to further speed up the procedure on provisionee client devices, a quick mode can be implemented to skip the operations of 2 and 3 set forth above. In the quick mode, the requested SSID generated by the provisionee becomes the provisioner SSID directly and the provisioner passphrase is derived from client nonce c_nonce and the SSID token. In the quick mode, the cloud server 310 is not involved in generating the provisioner SSID and passphrase.

Figure 4:
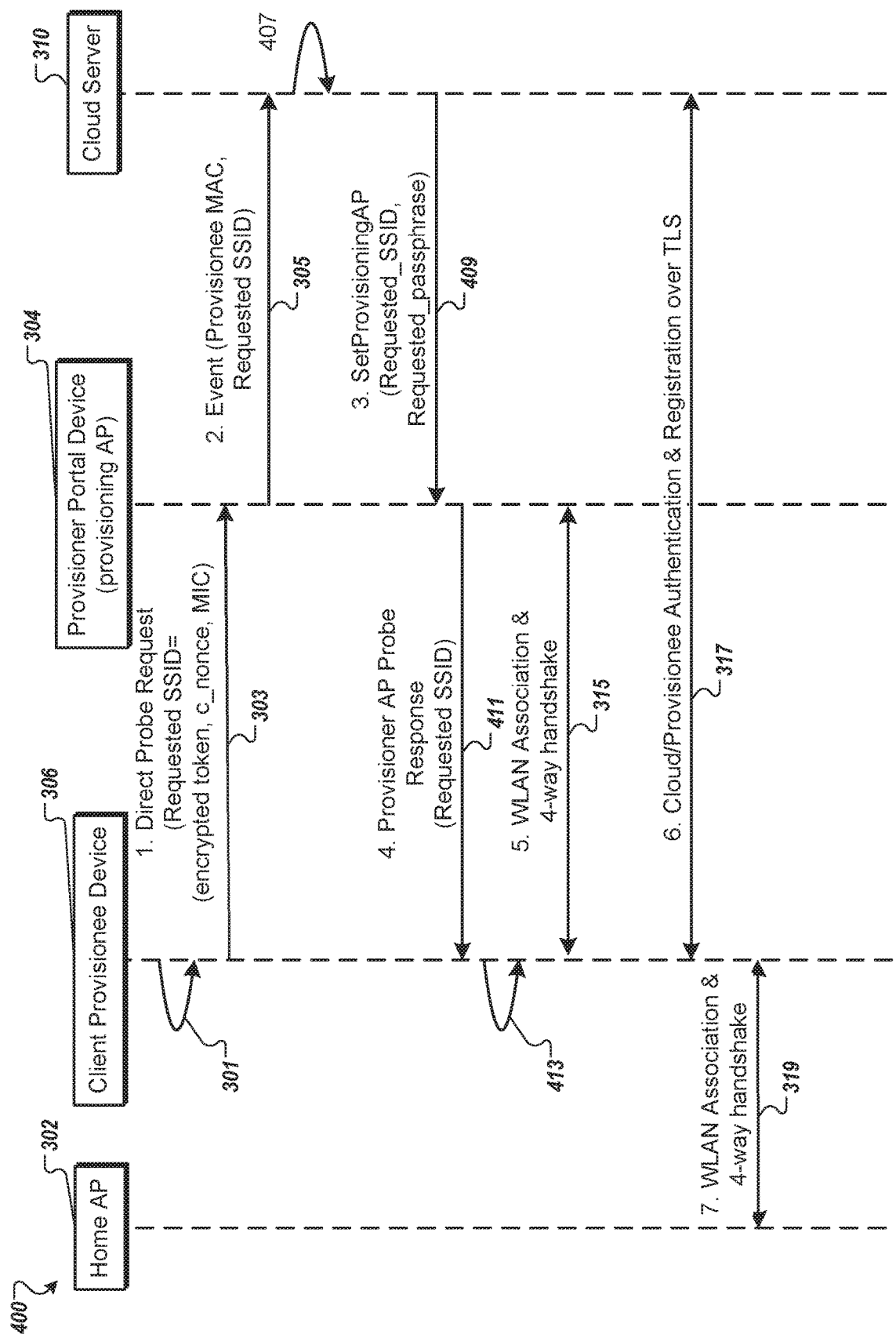
FIG. 4 is a sequence diagram of a cloud-based provisioning process for self-forming a WLAN group in a quick mode according to one embodiment.

FIG. 4 is a sequence diagram of a cloud-based provisioning process 400 for self-forming a WLAN group in a quick mode according to one embodiment. The cloud-based provisioning process 400 is similar to the cloud-based provisioning process 300 as noted by similar reference numbers. However, in the quick mode at 407, the cloud server 310 can use the requested SSID as the provisioner SSID instead of retrieving the provisionee's public key from the registration database, generating the server nonce, and encoding the SSID token using the server's private key and the provisionee's public key at 307. In essence, the cloud server 310 returns the same SSID, not a second SSID as described with respect to the cloud-based provisioning process 300. The cloud server 310 returns a return message 409 (SetProvisioning AP) with the requested SSID and requested passphrase (derived from the SSID token and client nonce and not the server nonce) to provisioner portal device 304 over the TLS secure channel.

The provisioner portal device 304 creates the provisioning AP using the credentials (requested SSID and requested passphrase) returned by the cloud server 310. The provisioning AP (provisioner portal device 304) starts replying to the client provisionee device's 306 probe request 303 with the probe response 411. In the probe response 411, the SSID IE field is the BASE64 encoded 32-byte ASCII requested SSID (first SSID).

From the scan results at 413, the client provisionee device 306 finds that there is an AP with BASE64 encoded 32-byte provisioner SSID. Since the requested SSID and requested passphrase are received, the client provisionee device 306 does not need to decode and match the SSID token as described above with respect to the cloud-based provisioning process 300. Like in the cloud-based provisioning process 300, the client provisionee device 306 in the cloud-based provisioning process 400 connects to the provisioner AP (created by the provisioner portal device 304) and conducts the mutual authentication with provisioner portal device 304 via a Wi-Fi 4-way handshake 315. At 317, the provisioner portal device 304 can operate as a gateway to allow the client provisionee device 306 to establish TLS connections to the cloud server 310 over the provisioning AP. The client provisionee device 306 further authenticates itself with the cloud server 310. At 317, the cloud server 310 transfers the corresponding cloud user account's home AP credentials to the client provisionee device 306. At 317, the client provisionee device 306 can also conduct firmware updating, system diagnosis and other functions through the provisioning AP. Using the obtained home AP credentials, the client provisionee device 306 switches to connect to the home AP with the AP credentials via a Wi-Fi 4-way handshake 319.

The following description provides one example of SSID message encoding and decoding procedures that can be performed by client provisionee device 306 and cloud server 310 in the quick mode. The SSID token to SSID IE field encoding in the SSID message encoding procedures can use the cryptographic primitives described above.

1. Provisionee follows the same steps to generate and encode the 24-byte BIN_REQUESTED_SSID from the encrypted c_token_cipher, c_nonce and C_MIC.
   BIN_REQUESTED_SSID=(c_token_cipher||c_nonce||C_MIC)
   In the meantime, the 32-byte BIN_REQUESTED_PASSPHRASE is also derived from the 16-byte concatenation of clear text SSID_token and c_nonce using HMAC_SHA256:
   BIN_REQUESTED_PASSPHRASE=HMAC_SHA256(ECDH_Key, SSID_token||c_nonce)
   The first 32 bytes of BASE64 encoded of BIN_REQUESTED_PASSPHRASE is the REQUESTED_PASSPHRASE.
   The BASE64 encoded REQUESTED_SSID from BIN_REQUESTED_SSID is broadcasted in the direct probe requests.
2. Provisioner forwards the REQUESTED_SSID to cloud server along with the provisionee MAC address.
3. Cloud server just simply decrypts the SSID toke from REQUESTED_SSID, and then derives the same BIN_REQUESTED_PASSPHRASE from SSID_token and c_nonce:
   BIN_REQUESTED_PASSPHRASE=HMAC_SHA256(ECDH_Key, SSID token||c_nonce)
   The first 32 bytes of BASE64 encoded of BIN_REQUESTED_PASSPHRASE is REQUESTED_PASSPHRASE.
   BIN_PROVISIONER_SSID and PROVISIONER_SSID are same as BIN_REQUESTED_SSID and REQUESTED_SSID, and PROVISIONER_PASSPHRASE is same as REQUESTED_PASSPHRASE.
   PROVISIONER_SSID=REQUESTED_SSID
   PROVISIONER_PASSPHRASE=REQUESTED_PASSPHRASE
   Cloud server returns the PROVISIONER_SSID and PROVISIONER_PASSPHRASE to provisioner.
4. Provisioner starts to respond provisionee's probe requests with REQUESTED_SSID. And provisionee can directly connect to the provisioner AP using the REQUESTED_SSID/REQUESTED_PASSPHRASE as credentials that are generated by its own.

Using quick mode, the client provisionee device 306 can perform the single operation below to locate one provisioner portal device and connect to the provisioner AP created by the provisioner portal device:

Provisionee generates the encoded requested SSID and derives the requested passphrase. Then client provisionee device 306 creates a Wi-Fi profile with the requested SSID/passphrase and asks the Wi-Fi stack to connect to the requested SSID. The Wi-Fi stack can broadcast the direct probe request. The cloud server 310 decodes the probe request and the provisioner portal device 304 creates such dynamic provisioner AP specified by client provisionee device at the time of the request (e.g., on the fly). The client provisionee device 306 is able to connect to the provisioner AP immediately without extra steps of analyzing the scan results.

In other embodiments, other cryptographic primitives and other encoding and decoding techniques can be used.

As described above, the provisioner portal device generates a unique credentials, including SSID and passphrase, with each client provisionee device (each enrollee). In order to support multiple enrollee devices concurrently or simultaneously, the provisioning AP needs to support per-client credentials, such as illustrated and described with respect to FIG. 5.

Figure 5:
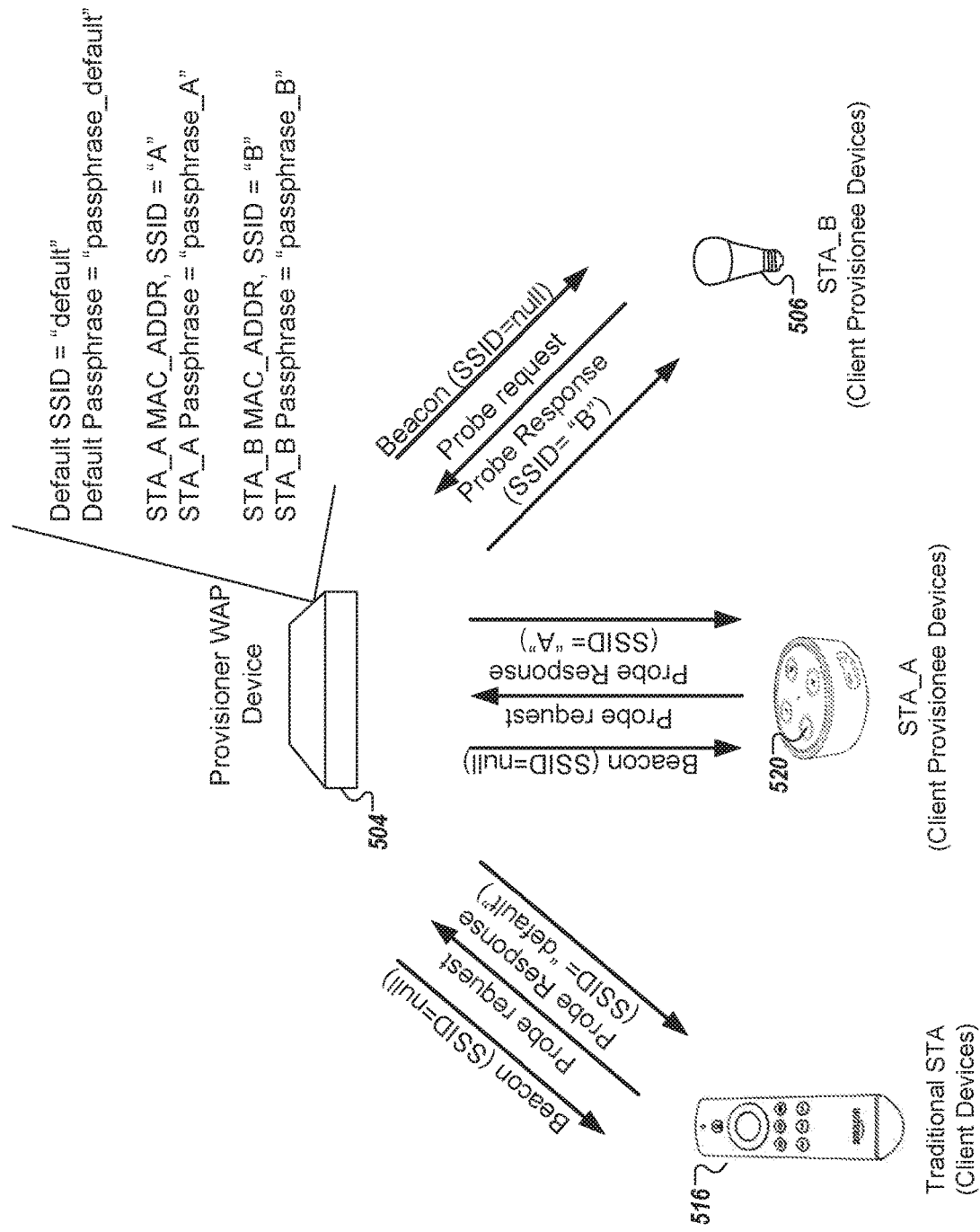
FIG. 5 is a network diagram of a cloud-base provisioning system with per-client credentials for a provisioning wireless access point (WAP) device that supports multiple client devices concurrently according to one embodiment.

FIG. 5 is a network diagram of a cloud-base provisioning system 500 with per-client credentials for a provisioning wireless access point (WAP) device 504 that supports multiple client devices concurrently according to one embodiment. As described above, to support multiple enrollee devices simultaneously (or concurrently), the provisioning WAP device 504 needs to support per-client WLAN credentials. The provisioning WAP device 504 can maintain an internal database with the SSIDs and passphrases. In one embodiment, the internal database can use the station client's MAC address as an index. Each station client can have its own SSID and passphrase in the internal database. As illustrated in FIG. 5, the enrollee devices can include a first station client 406 (e.g., smart light bulb), a second station client 520 (e.g., voice control and speaker system), and a third station client 516 (e.g., a remote control). In this example, the third station client 516 is a traditional station (STA) and the first station client 506 and second station client 520 are client provisionee devices, labeled STA_B and STA_A, respectively. As noted above, the third station client 516 is a traditional STA and is not provisionee device. The third station client 516 uses the traditional methods like manual input or WPS to learn the provisioner's default SSID/passphrase. It will not connect to provisioner's one-time and per-STA SSID. The provisioning WAP device 504 stores default credentials (e.g., default SSID="default" and default passphrase="passphrase default") for the traditional station clients in the internal database. The provisioning WAP device 504 stores unique credentials (e.g., STA_A MAC_ADDR, SSID="A" and STA_A Passphrase="passphrase_A) for the second station client 520 (STA_A) and stores unique credentials (e.g., STA_B MAC_ADDR, SSID="B" and STA_B Passphrase="passphrase_B) for the first station client 506 (STA_B). As noted above, the MAC address of the respective client provisionee device serves as an index to the SSID and passphrase for the respective client provisionee device.

During operation, the provisioning WAP device 504 uses STA client's MAC address as the key to store and retrieve the client's SSID and passphrase. When a probe request from a STA client is received, the provisioning WAP device 504 replies the probe response with the SSID belonging to the respective station client. After a STA client associates to the provisioning WAP, the client's own SSID and passphrase are used to complete the 4-way authentication handshake to generate a session key. The per-client SSID and passphrase can be dynamically generated via the above SSID token negotiation procedure. The provisioning WAP device can still have a default SSID and passphrase to support the traditional STA clients. In some embodiments, the dynamic per-client SSIDs are only sent to the corresponding STA client over probe responses. When the provisioning WAP device 504 is configured with hidden SSID, the SSID field in its beacon is null. As such, the same single beacon can serve and be accepted by all of the associated STA clients no matter if the STA clients are traditional station clients or not.

The per-client SSID feature, as well as other operations described herein, can be implemented in various layers or firmware of wireless devices, such as the Wi-Fi device driver, firmware (FW) layers, or the like that are implemented in various Wi-Fi® chipsets. For example, the Wi-Fi® device driver or firmware layers can be modified to interact with other layers appropriately or can be modified to implement the functionality described herein. The various embodiments described herein can be implemented as one of the various options to implement Amazon Wi-Fi Simple Setup (WSS) on 1P devices that can support secure provisioning of other 1P or 3P devices.

Figure 6:
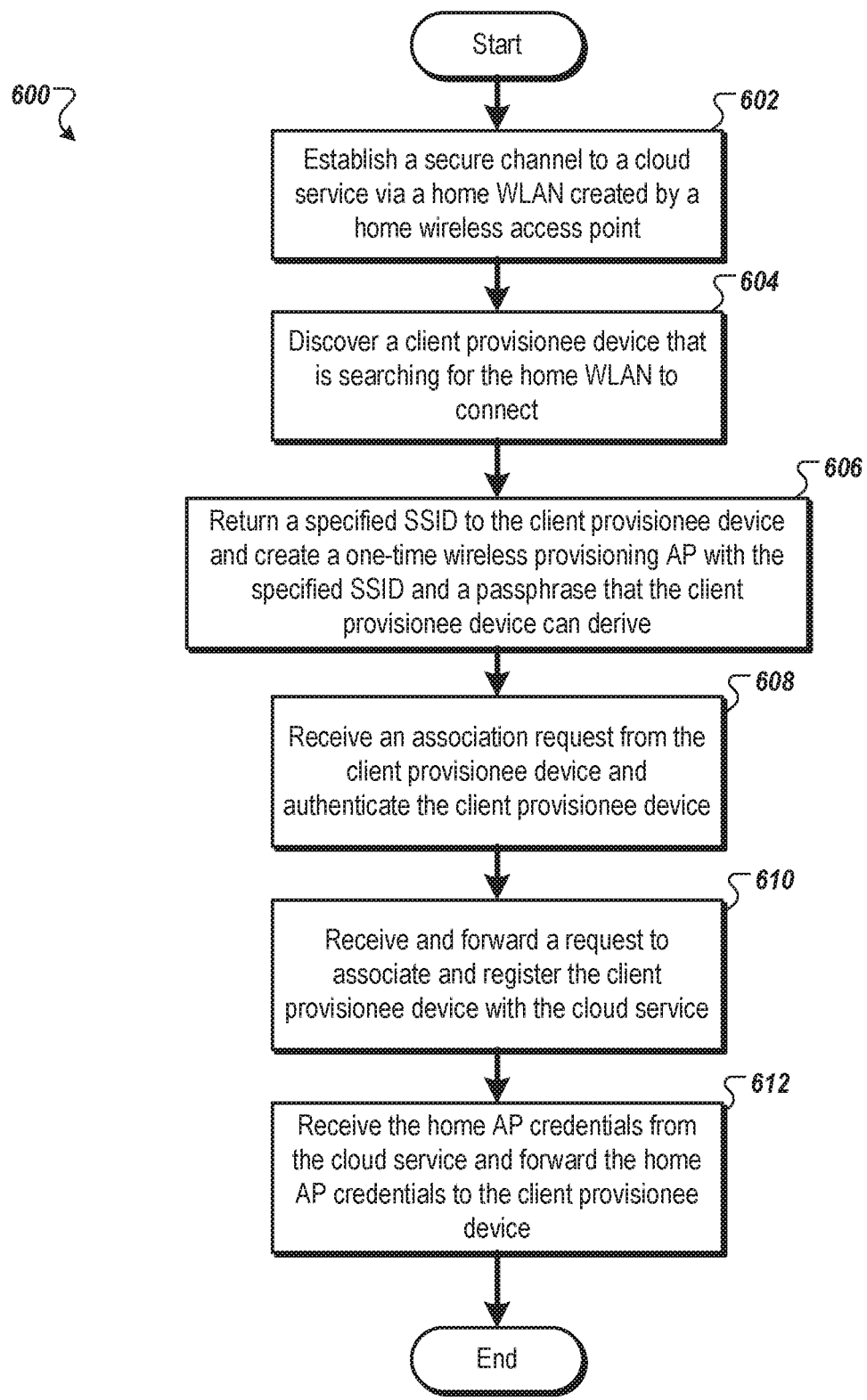
FIG. 6 is a flow diagram of a method for cloud-based wireless provisioning according to one embodiment.

FIG. 6 is a flow diagram of a method 600 for cloud-based wireless provisioning according to one embodiment. The method 600 may be implemented using processing logic comprising hardware, software, firmware, or any combination thereof. In one embodiment, the provisioner portal device 104 of FIG. 1 implements the method 600. In one embodiment, the provisioner portal device 304 of FIGS. 3-4 implements the method 600. In one embodiment, the provisioner portal device 504 of FIG. 5 implements the method 600.

Referring to FIG. 6, the processing logic begins by establishing a secure channel to a cloud service via a home WLAN created by a home wireless access point (block 602). The processing logic discovers a client provisionee device that is searching for the home WLAN to connect (block 604) by receiving a direct probe request. The client provisionee device does not have the home AP credentials to connect to the home WLAN. The processing logic returns a specified SSID to the client provisionee device and creates a one-time provisioning wireless network with the specified SSID and a passphrase that the client provisionee device can derive (block 606). The processing logic receives an association request from the client provisionee device and authenticates the client provisionee device (block 608). Assuming the client provisionee device is authenticated at block 608, the processing logic receives and forwards a request to associate and register the client provisionee device with the cloud service (block 610). The processing logic receives the home AP credentials from the cloud service and forwards the home AP credentials to the client provisionee device (block 612), and the method 600 ends. It should be noted that the client provisionee device, responsive to receiving the home AP credentials from the cloud service via the processing logic, the client provisionee device uses the home AP credentials to associate and authenticate with the home WAP device to connect to the home WLAN for LAN and Internet access without user interaction at the client provisionee device (or a companion device) to manually enter the AP credentials.

Figure 7:
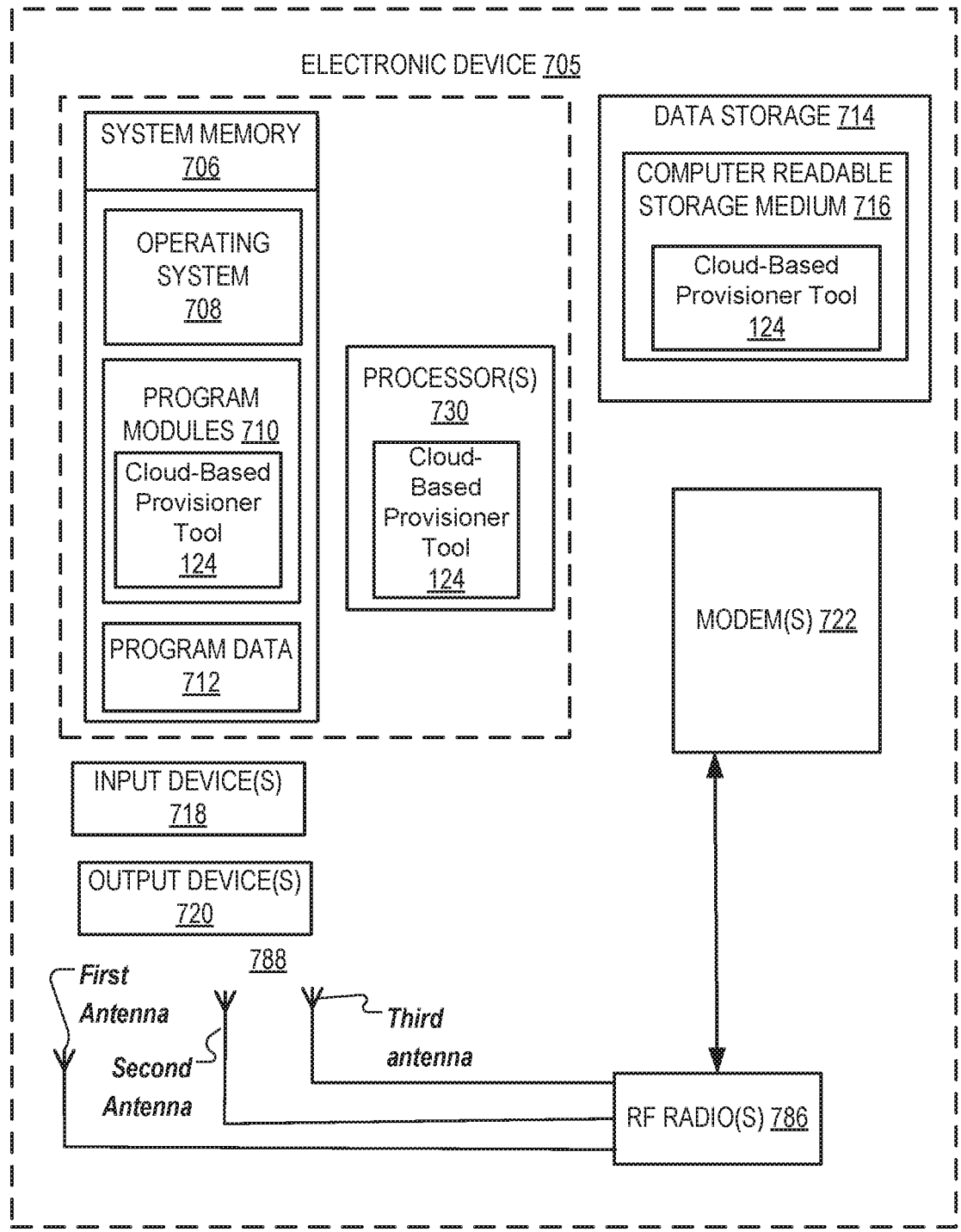
FIG. 7 is a block diagram of an electronic device in which embodiments of a cloud-based provisioner tool may be implemented.

FIG. 7 is a block diagram of an electronic device 705 in which embodiments of a cloud-based provisioner tool 124 may be implemented. The electronic device 705 may correspond to the provisioner portal device 104 of FIG. 1, the provisioner portal device 304 of FIGS. 3-4, the provisioner portal device 504 of FIG. 5. The electronic device 705 may be any type of computing device such voice control and speaker devices, televisions, television set top boxes, television dongles, an electronic book reader, a PDA, a mobile phone, a laptop computer, a portable media player, a tablet computer, a camera, a video camera, a netbook, a desktop computer, a gaming console, a DVD player, Blu-ray® player, a computing pad, a media center, an audio-input-enabled device, a speech-based personal data assistant, or the like. The electronic device 705 may be any portable or stationary user device. For example, the electronic device 705 may be an intelligent voice control and speaker system. Alternatively, the electronic device 705 can be any other device used in a WLAN network (e.g., Wi-Fi® network), a WAN network, or the like.

The electronic device 705 includes one or more processor(s) 730, such as one or more CPUs, microcontrollers, field programmable gate arrays, or other types of processing devices. The electronic device 705 also includes system memory 706, which may correspond to any combination of volatile and/or non-volatile storage mechanisms. The system memory 706 stores information that provides operating system component 708, various program modules 710 such as the cloud-based provisioner tool 124 described herein, program data 712, and/or other components. In one embodiment, the system memory 706 stores instructions of the methods as described herein. The electronic device 705 performs functions by using the processor(s) 730 to execute instructions provided by the system memory 706.

The electronic device 705 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein, such as the cloud-based provisioner tool 124 described herein. Instructions for the program modules 710 may reside, completely or at least partially, within the computer-readable storage medium 716, system memory 706 and/or within the processor(s) 730 during execution thereof by the electronic device 705, the system memory 706 and the processor(s) 730 also constituting computer-readable media. The electronic device 705 may also include one or more input devices 718 (keyboard, mouse device, specialized selection keys, etc.) and one or more output devices 720 (displays, printers, audio output mechanisms, etc.).

The electronic device 705 further includes a modem 722 to allow the electronic device 705 to communicate via a wireless network (e.g., such as provided by the wireless communication system) with other computing devices, such as remote computers, an item providing system, and so forth. The modem 722 can be connected to one or more radios 786. The radios may include a WLAN radio, a WAN radio, PAN radio, or the like, as described herein. Antennas 788 are coupled to the radios 786, which are coupled to the modem 722. The antennas 788 may include one or more WLAN antennas, one or more PAN antennas, or the like. Additional antennas may be used and may be GPS antennas, NFC antennas, other WAN antennas, or the like. The modem 722 allows the electronic device 705 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 722 may generate signals and send these signals to antennas 788, via RF radio(s) 786 as descried herein. Electronic device 705 may additionally include a WLAN radio, a GPS receiver, a PAN transceiver, and/or other RF radios. These RF radios may additionally or alternatively be connected to one or more of antennas 788. Antennas 788 may be configured to transmit in different frequency bands and/or using different wireless communication protocols. The antennas 788 may be directional, omnidirectional, or non-directional antennas. In addition to sending data, antennas 788 may also receive data, which is sent to appropriate RF radios connected to the antennas.

In one embodiment, the electronic device 705 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 722 is shown to control transmission and reception via antenna (788), the electronic device 705 may alternatively include multiple modems, each of which is configured to transmit/receive data via a different antenna and/or wireless transmission protocol.

The electronic device 705 delivers and/or receives items, upgrades, and/or other information via the network. For example, the electronic device 705 may download or receive items from an item providing system. The item providing system receives various requests, instructions and other data from the electronic device 705 via the network. The item providing system may include one or more machines (e.g., one or more server computer systems, routers, gateways, etc.) that have processing and storage capabilities to provide the above functionality. Communication between the item providing system and the electronic device 705 may be enabled via any communication infrastructure. One example of such an infrastructure includes a combination of a wide area network (WAN) and wireless infrastructure, which allows a user to use the electronic device 705 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 705.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A system comprising:
a wireless access point (WAP) device that provides local area network (LAN) and Internet access to wireless client devices via a home wireless local area network (WLAN);
a cloud computing system comprising one or more cloud servers that provide a cloud service, wherein the cloud service stores WAP credentials associated with the home WLAN;
a client provisionee device comprising a first WLAN radio, wherein the client provisionee device is registered to a cloud user account of the cloud service; and
a provisioner portal device comprising a second WLAN radio, wherein the provisioner portal device is registered to the cloud user account, wherein the provisioner portal device is connected to the cloud service over a first secure channel via the WAP device, wherein:
the client provisionee device broadcasts a direct probe request frame to create a one-time provisioning wireless network by the provisioner portal device, wherein the direct probe request frame identifies: 1) a first service set identifier (SSID) corresponding to the one-time provisioning wireless network; and 2) a media access control (MAC) address associated with the client provisionee device to the cloud service, wherein the first SSID identifies the client provisionee device;
the provisioner portal device receives the direct probe request frame and forwards the direct probe request frame to the cloud service;
the cloud service verifies that the client provisionee device is registered to the cloud user account and generates a second SSID and a passphrase;
the provisioner portal device receives the second SSID and the passphrase from the cloud service and creates the one-time provisioning wireless network with the second SSID and the passphrase;
the provisioner portal device replies to the direct probe request frame from the client provisionee device with the second SSID;
the client provisionee device receives the second SSID and connects to the one-time provisioning wireless network, and establishes a second secure channel to the cloud service through the one-time provisioning wireless network;
the cloud service transfers the WAP credentials to the client provisionee device over the second secure channel; and
the client provisionee device connects to the WAP device using the WAP credentials.

2. The system of claim 1, wherein the client provisionee device:
generates a SSID token and a client nonce; and
generates an ASCII string, wherein the ASCII string comprises the SSID token and the client nonce.

3. The system of claim 1, wherein the first SSID is a first ASCII string comprising a device identifier, a client nonce, and a first message integration code (MIC), and wherein the cloud service:
generates a server nonce and a second MIC;
generates a second ASCII string, wherein the second ASCII string comprises the server nonce and the second MIC, wherein the second ASCII string is the second SSID; and
generates a third ASCII string using the server nonce and the client nonce, wherein the third ASCII string is the passphrase; and
sends the second SSID and the passphrase to the provisioner portal device.

4. The system of claim 3, wherein the client provisionee device:
generates the passphrase using the server nonce and the client nonce; and
connects to the one-time provisioning wireless network using the passphrase.

5. A first device comprising:
a processor;
a memory device coupled to the processor; and
a wireless local area network (WLAN) interface, wherein the processor is to:
receive, from a second device, a first request comprising a first service set identifier (SSID) of a wireless local area network (WLAN);
forward, to a remote server via a wireless access point (WAP) device, the first SSID and a media access control (MAC) address associated with the second device;
receive, from the remote server via the WAP device, a second SSID and a passphrase;
send the second SSID to the second device;
create a second wireless network with the second SSID and the passphrase;
receive, from the second device, a second request to connect to the second wireless network, wherein the second request comprises the passphrase;
cause the second device to connect to the remote server via the second wireless network;
receive, from the remote server, WAP credentials associated with the WLAN; and
forward WAP credentials to the second device, wherein the second device uses the WAP credentials to connect to the WLAN.

6. The first device of claim 5, wherein the first SSID comprises a first character string derived from information that identifies the second device, and a client nonce, and an optional first message integration code (MIC), wherein the second SSID comprises a second character string derived from a server nonce.

7. The first device of claim 6, wherein the information comprises a SSID token, wherein the first character string comprises the SSID token, the client nonce, and a first message integration code (MIC), wherein the second character string is derived from the SSID token, the server nonce, and a second MIC, wherein the client nonce is a first random value, the server nonce is a second random value.

8. The first device of claim 6, wherein the first device and the WAP device are integrated in the same device.

9. The first device of claim 5, wherein the first request comprises a direct probe request frame comprising a SSID information element (IE) field comprising the first SSID, wherein the second request comprises a direct probe response frame comprising a SSID IE field comprising the second SSID.

10. The first device of claim 5, wherein the second wireless network is a one-time provisioning wireless network over which the second device securely retrieves the WAP credentials associated with the WLAN from the remote server without user interaction, wherein the first SSID is an encoded structure that contains an identity of the second device.

11. The first device of claim 5, wherein the processor is further to:
authenticate the passphrase in the second request;
conduct mutual authentication with the second device via a 4-way handshake;
receive a third request from the second device via the second wireless network requesting the WAP credentials; and
forwards the third request to the remote server via the WLAN.

12. The first device of claim 5, wherein the second wireless network is at least one of a software-enabled access point (softAP) or a wireless local area network (WLAN) peer-to-peer group owner (p2p-GO) interface.

13. A first device comprising:
a processor;
a memory device coupled to the processor; and
a wireless local area network (WLAN) interface, wherein the processor is to:
receive, from a second device, a first request comprising a service set identifier (SSID) of a wireless local area network (WLAN), wherein the SSID is derived from at least an SSID token and a client nonce;
forward, to a remote server via a wireless access point (WAP) device, the SSID and a media access control (MAC) address associated with the second device;
receive, from the remote server via the WAP device, the SSID and a passphrase associated with the SSID;
send the SSID to the second device;
create a second wireless network with the SSID and the passphrase;
receive, from the second device, a second request to connect to the second wireless network, wherein the second request comprises the passphrase;
cause the second device to connect to the remote server via the second wireless network;
receive, from the remote server, WAP credentials associated with the WLAN; and
forward the WAP credentials to the second device, wherein the second device uses the WAP credentials to connect to the WLAN.

14. The first device of claim 13, wherein the SSID comprises a first character string derived from information that identifies the second device, and a client nonce.

15. The first device of claim 14, wherein the information comprises a SSID token, the client nonce, and a first message integration code (MIC), wherein the client nonce is a first random value.

16. The first device of claim 13, wherein the first device and the WAP device are integrated in the same device.

17. The first device of claim 13, wherein the first request comprises a direct probe request frame comprising a SSID information element (IE) field comprising the SSID, wherein the second request comprises a direct probe response frame comprising a SSID IE field comprising the same SSID.

18. The first device of claim 13, wherein the second wireless network is a one-time provisioning wireless network over which the second device securely retrieves the WAP credentials associated with the WLAN from the remote server without user interaction, wherein the SSID is an encoded and signed structure that contains an identity of the second device.

19. The first device of claim 13, wherein the processor is further to:
   authenticate the passphrase in the second request;
   conduct mutual authentication with the second device via a 4-way handshake;
   receive a third request from the second device via the second wireless network requesting the WAP credentials; and
   forwards the third request to the remote server via the WLAN.

20. The first device of claim 13, wherein the second wireless network is at least one of a software-enabled access point (softAP) or a wireless local area network (WLAN) peer-to-peer group owner (p2p-GO) interface.

* * * * *